United States Patent
Bergman et al.

(10) Patent No.: US 8,180,168 B2
(45) Date of Patent: May 15, 2012

(54) ONE-PASS FILTERING AND INFRARED-VISIBLE LIGHT DECORRELATION TO REDUCE NOISE AND DISTORTIONS

(75) Inventors: Ruth Bergman, Haifa (IL); Patrick J. Chase, San Diego, CA (US); Ron Maurer, Haifa (IL); Yacov Hel-Or, Zichron Yaskov (IL); Mark Majette, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1518 days.

(21) Appl. No.: 11/623,697

(22) Filed: Jan. 16, 2007

(65) Prior Publication Data
US 2008/0170800 A1 Jul. 17, 2008

(51) Int. Cl.
*G06K 9/40* (2006.01)
(52) U.S. Cl. ......................... 382/260; 382/261
(58) Field of Classification Search .................. 382/260, 382/261
See application file for complete search history.

(56) References Cited

U.S. PATENT DOCUMENTS

| | | | |
|---|---|---|---|
| 5,266,805 A | | 11/1993 | Edgar |
| 6,711,302 B1 * | | 3/2004 | Lee ................................ 382/275 |
| 2005/0025378 A1 * | | 2/2005 | Maurer ........................ 382/260 |
| 2005/0244073 A1 | | 11/2005 | Keshet |
| 2006/0008171 A1 * | | 1/2006 | Petschnigg et al. ........... 382/254 |
| 2006/0226337 A1 | | 10/2006 | Lim et al. |
| 2007/0165962 A1 * | | 7/2007 | Smirnov et al. ............... 382/260 |

FOREIGN PATENT DOCUMENTS

JP 2006180268 A * 7/2006

OTHER PUBLICATIONS

M. Bertalmio et al., "Simultaneous structure and texture image inpainting," IEEE Trans. on Image Proc'ing, vol. 12 (8), Aug. 2003.
A. Buades et al., "A review of image denoising algorithms, with a new one," Multiscale Modeling & Simulation (SIAM interdisciplinary journal), vol. 4 (2), 2005.
A.A. Efros et al., "Texture synthesis by non-parametric sampling," in Procs. of IEEE Internation Conf. on Computer Vision, Sep. 1999.
C. Tomasi et al., "Bilatering filtering for gray and color images," ICCV, 1998.
L. Zadeh, "Fuzzy Logic," IEEE Computer, Apr. 1988.
L. Zadeh, "Fuzzy Sets," Information and Control, vol. 8, 1965.

* cited by examiner

*Primary Examiner* — Anand Bhatnagar
*Assistant Examiner* — Soo Park

(57) ABSTRACT

A scanning device includes a scanning mechanism and a processing mechanism. The scanning mechanism scans an image fixed on a medium to generate a digital infrared representation of the image and a digital visible light representation of the image. The processing mechanism substantially reduces effects of noise and distortions within the digital visible light representation of the image in one pass. The processing mechanism at least decorrelates visible light aspects from the infrared representation of the image and employs a one-pass filter that uses both the infrared and the visible light representations of the image.

12 Claims, 6 Drawing Sheets

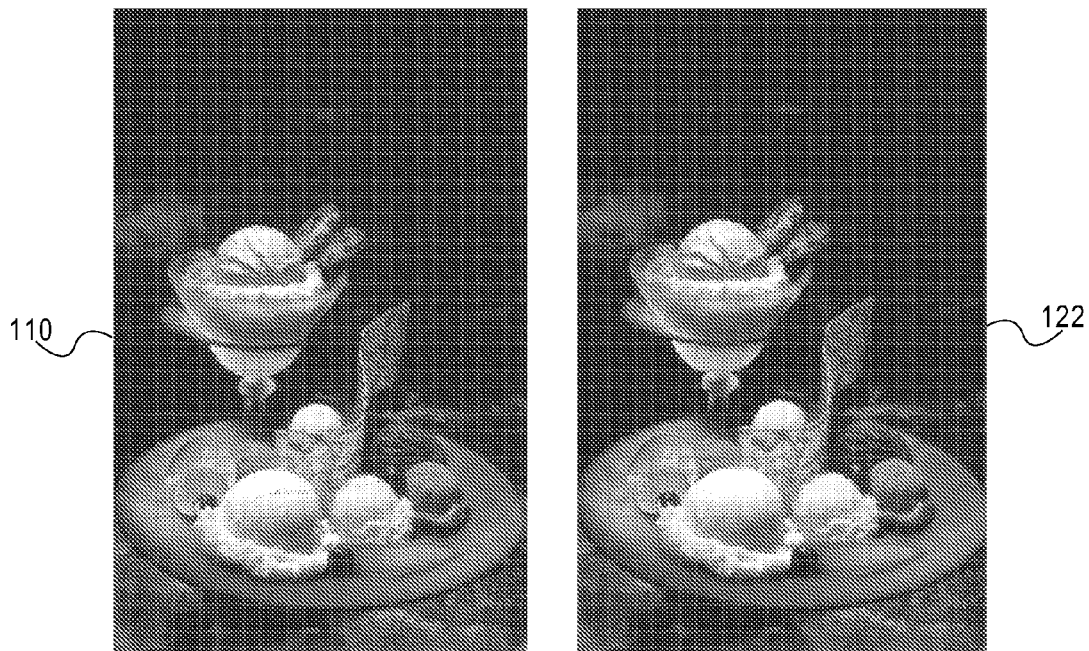
FIG. 2A  FIG. 2D
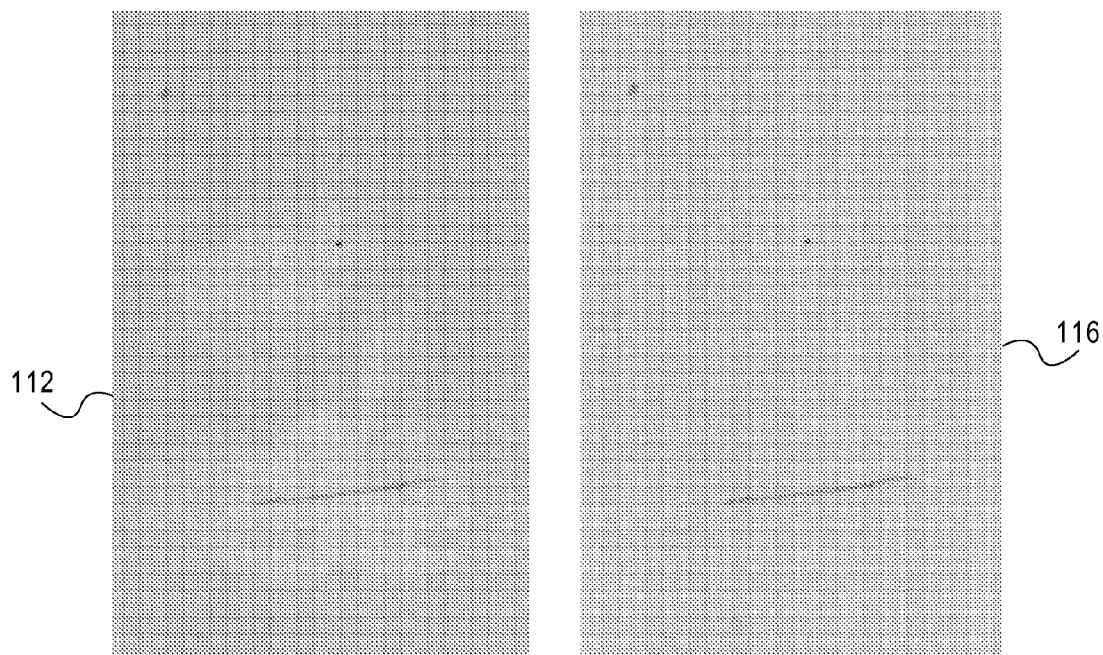
FIG. 2B  FIG. 2C

ONE-PASS FILTERING AND INFRARED-VISIBLE LIGHT DECORRELATION TO REDUCE NOISE AND DISTORTIONS

BACKGROUND

Scanning devices include standalone scanners, as well as "all-in-one" (AIO) devices that include scanning mechanisms. Scanning devices typically optically scan an image fixed on a medium, such as photographic film, to generate a digital representation of the image. The digital representation may then be manipulated by a computing device, such as by being emailed to desired recipients, uploaded to a web site, and so on.

A drawback to scanning images fixed on media into corresponding digital representations of the images is that dust, scratches, defects, and other distortions on the images as fixed on the media may be reproduced within the corresponding digital representations of the images. Another drawback is that random noise and distortions of various types may be introduced into the corresponding digital representations of the images. Current solutions to removing all such noise and distortions from digital representations of images can be less than ideal.

BRIEF DESCRIPTION OF THE DRAWINGS

FIGS. 2A, 2B, 2C, and 2D are diagrams depicting exemplary performance of the process of FIG. 1, according to an embodiment of the invention.

DETAILED DESCRIPTION OF THE DRAWINGS

Overview of Image Distortion Removal Process

Figure 1:
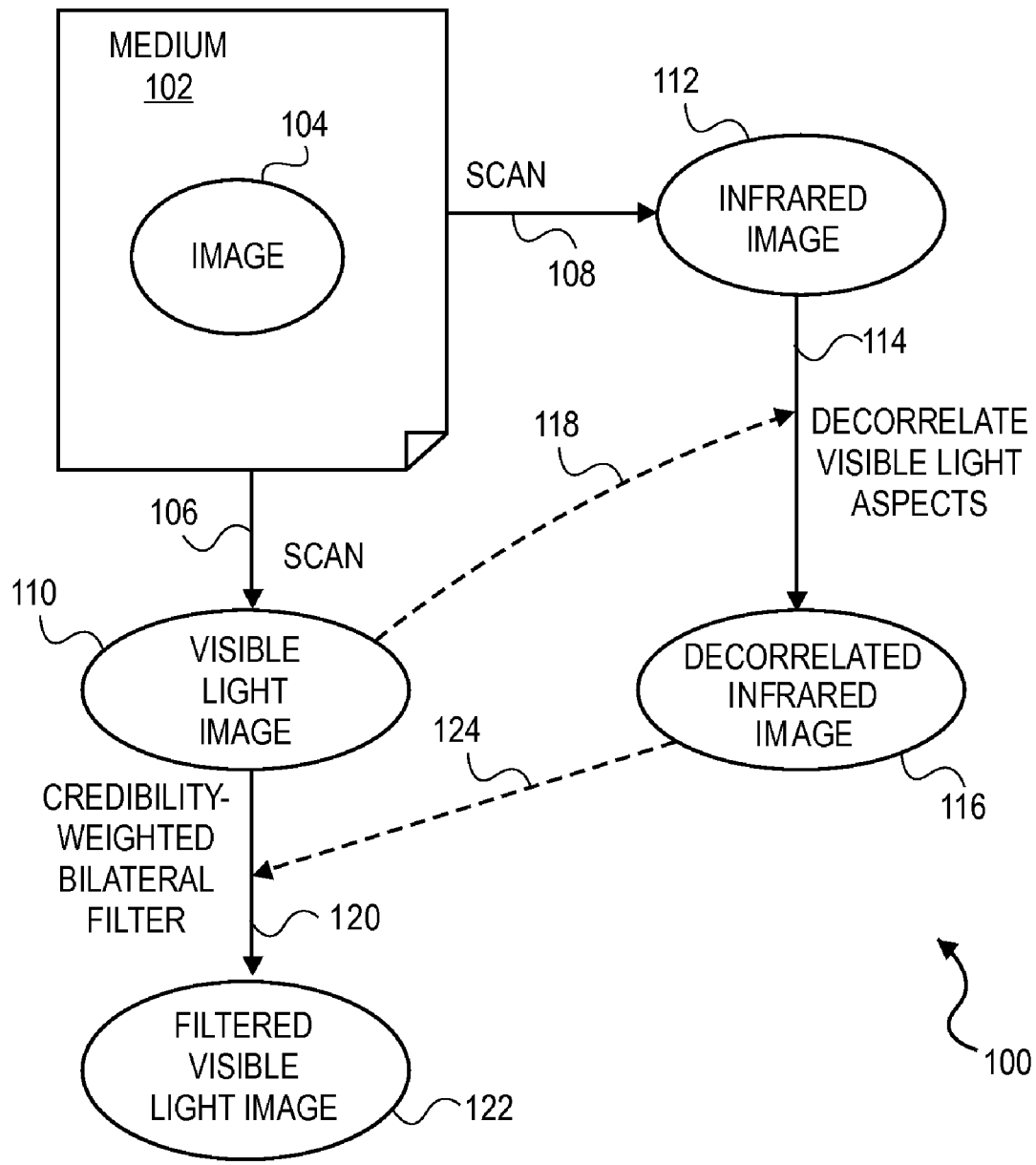
FIG. 1 is a diagram depicting a process by which distortions are removed from a digital representation of an image, according to an embodiment of the invention.

FIG. 1 illustratively depicts a process 100 by which distortions can be removed from a digital visible light representation 110 of an image 104, according to an embodiment of the invention. Such distortions can include dust, scratches, artifacts, defects, noise bursts, and other distortions that may be present. For instance, the terminology "noise burst" refers to a pixel or a group of pixels within an image that has a noise signal which is particularly strong relative to the overall noise level of the image itself, and greater than the local contrast of the image.

The image 104 may be originally fixed on a imaging medium 102, such as film, like a film negative or a slide, or another type of imaging medium. The image 104 as fixed on the medium 102 may be optically scanned, as indicated by arrows 106 and 108, to result in a digital visible light representation 110 and a digital infrared representation 112, respectively, of the image 104.

The digital visible light representation 110 of the image 104 is a digital representation in that it is data electronically or digitally representing the image 104. The representation 110 is a visible light representation in that it at least substantially represents how the image 104 is perceived under visible white light, such as by the human visual system (HVS). Such visible white light can include all the wavelengths of light within the visible light spectrum. Thus, for instance, when the digital visible light representation 110 of the image 104 is displayed on a display device, the HVS perceives the representation 110 of the image 104 as at least substantially identical to the image 104 as fixed on the imaging medium 102.

The image 104 as fixed on the medium 102 may be a color image, a grayscale image, or a black-and-white image. The digital visible light representation 110 of the image 104 may likewise represent the image 104 in color, grayscale, or black-and-white, but not necessarily in correspondence with how the image 104 is fixed on the medium 102. For example, the image 104 may be fixed as a color image on the medium 102, and the digital visible light representation 110 thereof may likewise be in color. Alternatively, however, the representation 110 of the image 104 may be in grayscale or in black-and-white, even if the image 104 is itself fixed on the medium 102 in color, for instance.

The digital infrared representation 112 of the image 104 is likewise a digital representation in that it is data electronically or digitally representing the image 104. The representation 112 is an infrared representation in that it at least substantially represents how the image 104 is perceived under infrared light. The infrared representation 112 of the image 104 has been found to generally include primarily just the scratches, dust, and other defects within the visible light representation 110 of the image 104, as may be found on the image 104 as fixed on the medium 102, or which may result from the scanning process represented by the arrows 106 and 108. However, due to the scanning process indicated by the arrow 108 the digital infrared representation 112 of the image 104 can also commonly include a small portion of visible light aspects of the image 104, commonly known as "crosstalk."

FIGS. 2A and 2B show representative examples of the digital visible light representation 110 and the digital infrared representation 112 of the image 104, respectively, according to an embodiment of the invention. The digital visible light representation 110 of the image 104 in FIG. 2A is in grayscale for exemplary purposes only, but may alternatively be in color or in black-and-white. The digital visible light representation 110 of the image 104 includes a large visible scratch, extending over the two scoops of vanilla ice cream in the lower quarter of the image 104.

The digital infrared representation of the image 104 in FIG. 2B substantially includes just the distortions found on the image 104. For instance, the large visible scratch apparent within the digital visible light representation 110 of the image 104 in FIG. 2A is much more discernable within the digital infrared representation of the image 104 in FIG. 2B. Other distortions found on the image 104, which are less apparent within the digital visible light representation 110, may in some embodiments also be much more discernable within the digital infrared light representation 112.

However, some crosstalk of the visible light aspects of the image 104 is also apparent within the digital infrared representation 112 of the image 104 in FIG. 2B. That is, a faint "ghosting" of the digital visible light representation 110 of the image 104 in FIG. 2A is apparent within the digital infrared representation 112 of the image 104 in FIG. 2B. Such visible light aspects are desirably not present within the digital infrared representation 112. However, as a result of the scanning process, such crosstalk between the digital visible light representation 10 and the digital infrared representation 112 commonly occurs to at least some extent, as is evident in FIG. 2B.

Referring back to FIG. 1, as indicated by arrow 114, the visible light aspects are decorrelated from the infrared representation 112 of the image 104, to result in what is referred to in FIG. 1 as the digital decorrelated infrared representation 116 of the image 104. The decorrelation process is described in more detail in a later section of the detailed description. The result of the decorrelation process, which employs the digital visible light representation 110 of the image 104, as indicated by dotted arrow 118, is that the visible light aspects, or crosstalk, are at least substantially removed from the infrared representation 112 within the decorrelated infrared representation 116 of the image 104.

FIG. 2C shows a representative example of the digital decorrelated infrared representation 116 of the image 104, according to an embodiment of the invention. As compared to the digital infrared representation 116 of the image 104 in FIG. 2B, the decorrelated infrared representation 116 of the image 104 has the visible light aspects, or crosstalk from the digital visible light representation 110 of the image 104 in FIG. 2A, removed. That is, it can be said that the infrared representation 112 in FIG. 2B has been decorrelated from the visible light representation 110 in FIG. 2A to result in the decorrelated infrared representation 116 of the image 104 in FIG. 2C.

Referring back to FIG. 1, as indicated by arrow 120, the digital visible light representation 110 of the image 104 is subjected to a credibility-weighted bilateral filter to result in what is referred to in FIG. 1 as the digital filtered visible light representation 122 of the image 104. The credibility-weighted bilateral filtering process is described in more detail in a later section of the detailed description. The filtering represented by the arrow 120 at least substantially reduces or removes the distortions within visible light representation 110 that are identified within the decorrelated infrared representation 116, and thus employs the decorrelated infrared representation as indicated by dotted arrow 124 in generating the filtered visible light representation 122.

The filtering represented by the arrow 120 further at least substantially reduces or removes random noise from the digital visible light representation 110 of the image 104 in generating the digital filtered visible light representation 122 of the image 104. Such noise is commonly inherent in the scanning process represented by the arrow 106 to capture the digital visible light representation 110 of the image 104 fixed on the medium 102. Additionally, noise may further be present in the image 104 itself as fixed on the medium 102, originating for instance, from halftoning or the texture of the media.

FIG. 2C shows a representative example of the digital filtered visible light representation 122 of the image 104, according to an embodiment of the invention. As compared to the digital visible light representation 110 of the image 104 in FIG. 2A, the filtered visible light representation 122 has substantially reduced or removed distortions therewithin. For example, the scratch across the two scoops of vanilla ice cream in the lower quarter of the image 104 within the visible light representation 110 in FIG. 2A has been removed within the filtered visible light representation 122 of the image 104 in FIG. 2D, without affecting the image 104 itself.

Decorrelation Process

Figure 3:
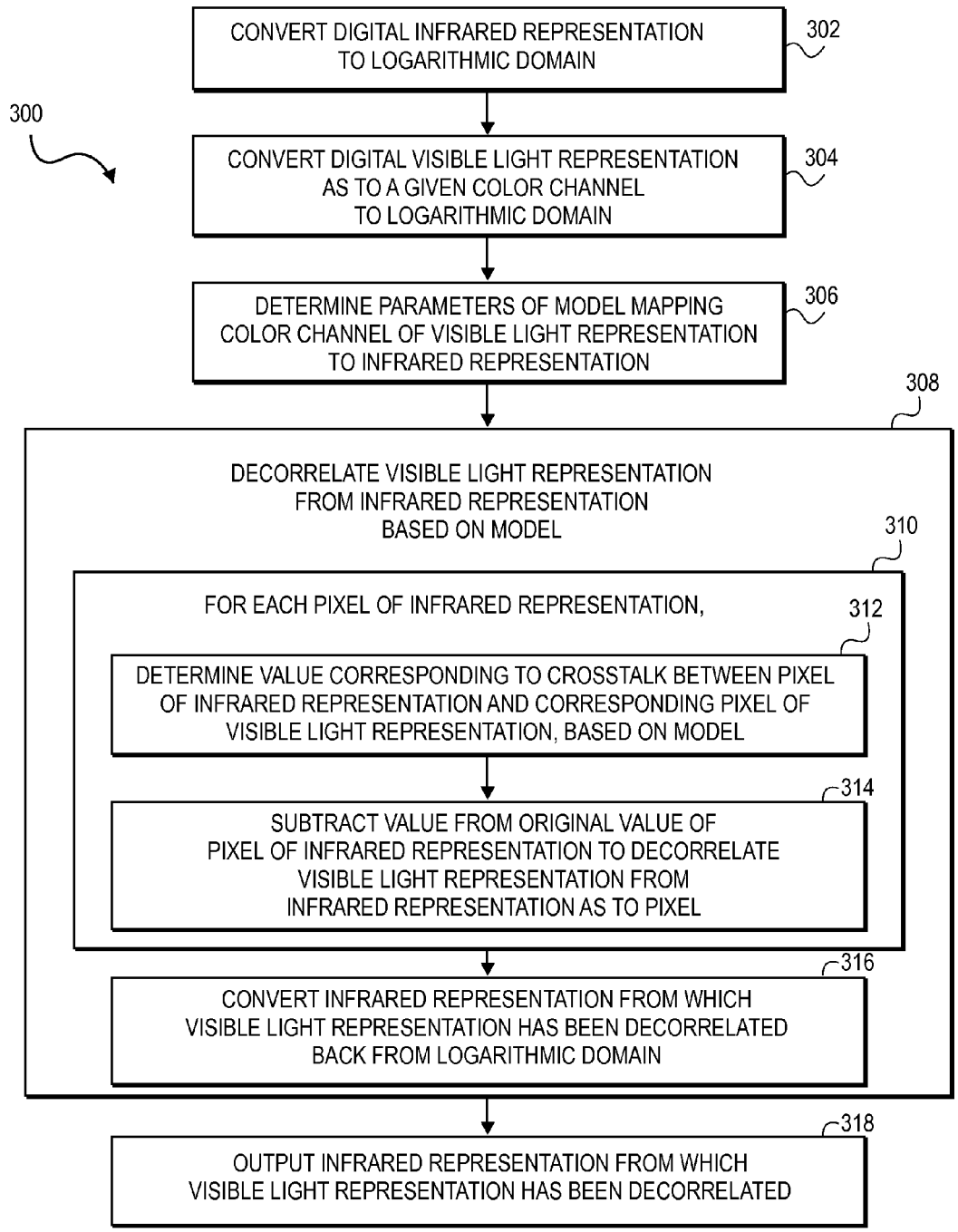
FIG. 3 is a flowchart of a method for decorrelating a visible light representation of an image from an infrared representation of the image, according to an embodiment of the invention.

FIG. 3 shows a method 300 for decorrelating the digital visible light representation 110 of the image 104 from the digital infrared representation 112 of the image 104 to result in the digital decorrelated infrared representation 116 of the image 104, according to an embodiment of the invention. The method 300 may be implemented as a computer program stored on a computer-readable medium. For example, the computer-readable medium may be part of a scanning device, such that the computer program stored thereon is executed within the scanning device.

It is noted that all of the representations 110, 112, 116, and 122 of the image 104 may be considered as having a number of pixels, where for each pixel a given representation has one or more values. The pixels may be organized in a rectangular grid, as can be appreciated by those of ordinary skill within the art, or in another manner. The infrared representations 112 and 116, for instance, may have a value for each of their pixels corresponding to infrared light absorption or reflection of the image 104 as fixed on the medium 102 during the scanning process indicated by the arrow 108.

By comparison, the visible light representations 110 and 122, if in color, may have three values for each of their pixels, corresponding to red, green, and blue color channel values of the image 104 as fixed on the medium 102 and as detected the scanning process indicated by the arrow 106. That is, each such pixel has a red value, a green value, and a blue value, which when combined result in the pixel's actual color, as can be appreciated by those of ordinary skill within the art. Alternatively, the visible light representations 110 and 112, if in color, may have values corresponding to color channels other than the red, green, and blue color channels that can be employed to numerically describe the color of each pixel. Furthermore, the visible light representations 110 and 112, if in black-and-white or in grayscale, may have just one value for each of their pixels, corresponding to black-and-white or grayscale contrast of the image 104 as fixed on the medium 102 and as detected during the scanning process indicated by the arrow 106.

The digital infrared representation 112 of the image 104 is converted to a logarithmic domain (302), where the infrared representation 112 is not already in the logarithmic domain. That is, the infrared representation 112 may initially already be in a logarithmic domain, such as a $\log_{10}$ domain. Where it is not, the infrared representation 112 is converted to a logarithmic domain in part 302, by employing an inverse gamma-correction function, or another type of appropriate transformation, as can be appreciated by those of ordinary skill within the art. The logarithmic domain is also referred to as a density domain, as can be appreciated by those of ordinary skill within the art. Where the infrared representation 112 is not already in a logarithmic domain, it is converted to the logarithmic domain on a per-pixel basis.

Similarly, the digital visible light representation 110 of the image 104 is converted to a logarithmic domain, as to a particular color channel thereof (304). The visible light representation 110 may initially be in the linear domain, and may be converted to the logarithmic domain, such as a $\log_{10}$ domain, by employing an inverse gamma-correction function, or another type of appropriate transformation, as can be appreciated by those of ordinary skill within the art. The visible light representation is converted to the logarithmic domain on a per-pixel basis.

In one embodiment, just one color channel of the digital visible light representation 110 of the image 104 is converted to the logarithmic domain. For instance, just the red values, the green values, or the blue values of the pixels of the visible light representation 110 are converted to the logarithmic domain. In one embodiment, the red color channel of the digital visible light representation 110 is in particular converted.

One or more parameters of a model mapping the color channel of the digital visible light representation 110 of the image 104, as converted to the logarithmic domain, to the digital infrared representation 112 of the image 104, as also converted to the logarithmic domain, are then determined (304), or estimated. For example, in one embodiment, a linear model of the form $y=a*x+b$ can be employed, although more sophisticated non-linear models may also be employed. In this linear model, y corresponds to infrared values of the pixels of the infrared representation 112, and x corresponds to red, green, or blue color channel values of the pixels of the visible light representation 110. The parameter a corresponds to the slope of the line of the model, and the parameter b corresponds to the y-intercept of the line of the model.

Figure 4:
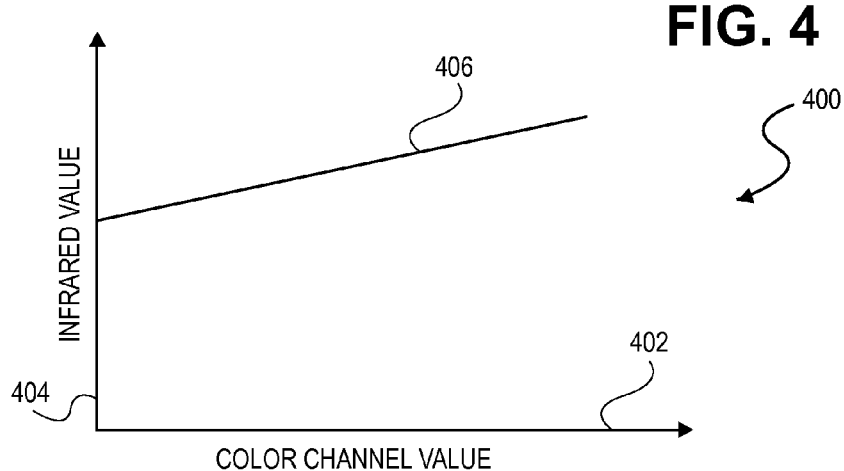
FIG. 4 is a diagram of a representative linear model that may be employed in the method of FIG. 3, according to an embodiment of the invention.

FIG. 4 shows a graph 400 illustratively depicting a representative linear model for which the parameters thereof can be determined in part 304 of the method 300 of FIG. 3, according to an embodiment of the invention. The x-axis 402 denotes red, green, or blue color channel values of the pixels of the digital visible light representation 110, and the y-axis 404 denotes infrared values of the pixels of the digital infrared representation 112. The parameter a corresponds to the slope of the line 406 of the model, and the parameter b corresponds to the value of the line 406 of the model at which the line 406 crosses the y-axis 404.

The parameters of a linear model in particular that maps a color channel of the digital visible light representation 110 to the digital infrared representation 112 can be determined by employing any type of line-fitting methodology. For example, for each pixel of the image 104, the pair of values (x, y) is mapped onto the graph 400. The value x for a pixel of the image 104 is one of the color channel values of the pixel within the visible light representation 110 of the image 104, such as the pixel's red color channel value. The value y for a pixel of the image 104 is the pixel's infrared value within the infrared representation 112 of the image 104. Once the pairs of values have been mapped onto the graph 400 for all the pixels of the image 104, a line that best describes the relationship between the values (x, y) for all the pixels is determined. Determining this line in turn determines the slope and y-intercept parameters of the linear model.

Referring back to FIG. 3, once the model parameters have been determined, the digital visible light representation 110 of the image 104 is decorrelated from the digital infrared representation 112 of the image 104 based on the model (308). In particular, the following is performed for each pixel of the infrared representation 112 of the image 104 (310). First, the value corresponding to the crosstalk between this pixel and the corresponding pixel of the visible light representation of the image 104 is determined (312). That is, the red color channel value of the pixel, for instance, is evaluated as the x value within the model $y=a*x+b$, to generate the crosstalk value of the pixel, as the y value. This crosstalk value can particularly correspond to the absorption of infrared light by the cyan colorant within the image 104 as fixed on the medium 102, for instance.

Thereafter, this crosstalk value of the pixel in question is subtracted from the original value of the pixel within the digital infrared representation 112 of the image 104 (314). That is, the infrared value of the pixel of the image 104 within the digital infrared representation 112 has subtracted therefrom the crosstalk value of the pixel determined in part 312 using the model. Therefore, the contribution to the infrared value by absorption of infrared light by the cyan colorant within the image 104 as fixed on the medium 102 is effectively removed from the digital infrared representation 112 as to this pixel.

In one embodiment, in part 314 of the method 300 of FIG. 3, a constant may further be added to the resulting infrared value of each pixel, so that the resulting infrared values of all the pixels of the image 104 are greater than zero or non-negative. For example, once parts 312 and 314 have been performed for all the pixels of the image 104, the lowest resulting infrared value –y for any pixel may be located. As such, a constant B equal to y or (y+1) may be added to the resulting infrared value of each pixel of the image 104 so that none of the infrared values less than zero or non-positive. Adding the constant B to the resulting infrared value of each pixel can be referred to as adding a constant background level to the digital infrared representation 112.

Thereafter, the digital infrared representation 112 of the image 104, from which the digital visible image representation 110 of the image 104 has been decorrelated to result in the digital decorrelated infrared representation 116 of the image 104, is converted back from the logarithmic domain (316), where the infrared representation 112 was not initially in the logarithmic domain. For instance, where the infrared representation 112 was not initially in the logarithmic domain, the decorrelated infrared representation 116 is converted back from the logarithmic domain back to its original, linear domain. This conversion may be achieved by performing the inverse of the transform applied to the infrared representation 112 in part 302 of the method 300.

The digital decorrelated infrared representation 116 of the image 104 is then output (318). Such outputting can encompass any of a number of different acts or steps, and is not limited by embodiments of the invention. For example, the decorrelated infrared representation 116 may be stored on a computer-readable storage medium, such as a volatile or a non-volatile storage of a scanning device or a computing device. As another example, the decorrelated infrared representation 116 may be transmitted or sent from one device to another device. As a third example, the decorrelated infrared representation 116 may even be printed by a printing device on a printing medium, such as paper or another type of printing media.

Credibility-Weighted Bilateral Filtering Process

Figure 5:
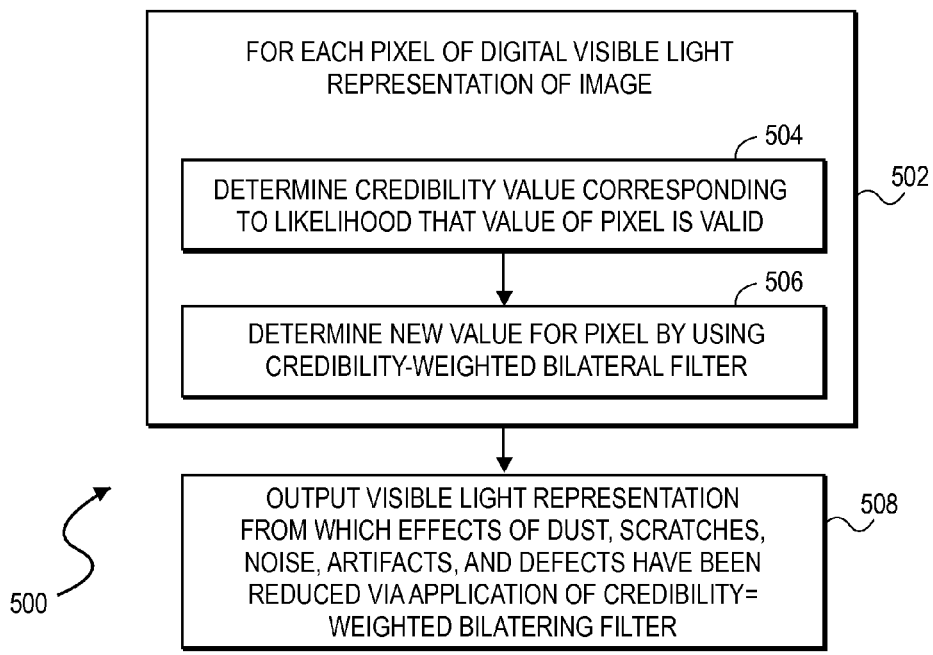
FIG. 5 is a flowchart of a method for at least substantially reducing or removing distortions from a digital representation of an image by using a credibility-weighted bilateral filter, according to an embodiment of the invention.

FIG. 5 shows a method 500 for at least substantially reducing or removing both noise and distortions from the digital visible light representation 110 of the image 104, according to an embodiment of the invention. The term "noise" here collectively refers to random (un-biased) deviations of the digital visible light representation 110 from the actual image 104, while the term "distortions" refers to various types of biased deviations from the actual image 104. This process may be used to denoise the image like conventional denoising filters and, in addition, remove dust, scratches, defects, artifacts, noise bursts, and/or other distortions that may not be removed by conventional denoising filters. Such distortions may be in the visible light representation 110 due to their presence within the image 104 as fixed on the imaging medium 102, and/or may be generated during the scanning process indicated by the arrow 106. The method 500 may be implemented as a computer program stored on a computer-readable medium. For example, the computer-readable medium may be part of a scanning device, such that the computer program stored thereon is executed within the scanning device. It is noted that whereas prior art approaches for reducing the effects of both noise and distortions within a visible light representation of an image typically have to perform separate passes over the visible light representation for dealing separately with noise and with distortions. At least some embodiments of the invention are unique in that they can just perform a single pass over the visible light representation to reduce the effect of both noise and distortions, thereby reducing the overall computational load.

The following is performed for each pixel of the digital visible light representation 110 of the image 104 (502). First, a credibility value is determined for the pixel (504). The credibility value can in one embodiment correspond to the likelihood that the pixel's value does not correspond to distortions within the visible light representation 110. A pixel that does not correspond to a distortion within the visible light representation has credibility value of 1, even if it includes noise. The terminology "a pixel's value" encompasses the pixel having more than one value. For instance, where the visible light representation 110 is in color, a pixel may have a red value, a green value, and a blue value, as has been described in the previous section of the detailed description. Generally, the credibility value for a pixel may be determined based on the value of the pixel within the visible light representation 110, the value of the pixel within the infrared representation 112, or on a combination thereof. The credibility value for a pixel may further be referred to as the confidence value of the pixel.

A particular manner by which the credibility value for a pixel can be determined, using the decorrelated infrared representation 116 of the image 104, is described in the next section of the detailed description. However, in general, the credibility value for a pixel can be denoted as C, where C has a value between 0 and 1. A credibility value of 0 means that the pixel's value does not contain any credible information. That is, the likelihood of the pixel's value being representative of a part of the true image 104 is identical to a random measurement. Thus, a credibility value of 0 means that the pixel's value is assumed not to be representative at all of a part of the image 104 itself, but rather completely corresponds to a distortion within the visible light representation 110 of the image 104.

By comparison, a credibility value of 1 means that it is certain that the value of the pixel in question does not correspond to a distortion within the visible light representation 110 of the image 104. However, this value may nevertheless still include the effect of regular random noise, such as sensor noise, and so on. A credibility value between 0 and 1 therefore means that there is a corresponding likelihood that the pixel's value is representative of a part of the image 104 itself, such that there is a likelihood of (1−C) that the pixel's value corresponds to a distortion within the visible light representation 110 of the image 104.

Next, a new value for the pixel is determined by using a credibility-weighted bilateral filter (506). That is, in lieu of a classical bilateral filter, which is known within the art, a bilateral filter is employed that uses the credibility values of the pixels of the digital visible light representation 110 of the image 104 to generate a new value for the pixel. Such a credibility-weighted bilateral filter may use a zero-order bilateral filter; an n-order bilateral filter, where n is greater than zero; or, a combined-order bilateral filter, which combines several n-order bilateral filters of different orders. Examples of such credibility-weighted bilateral filters are described later in the detailed description.

Figure 6:
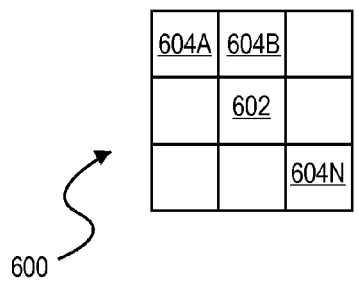
FIG. 6 is a diagram of a representative three-by-three neighborhood of pixels, which may be employed in relation to the method of FIG. 5, according to an embodiment of the invention.

First however, operation of a classical zero-order bilateral filter is described. The classical zero-order bilateral filter operates on a local neighborhood of k×k pixels, centered at a central pixel for which a new value is to be determined. As such, k is odd where the neighborhood is a square grid of pixels centered at the central pixel. Each pixel within the neighborhood other than the central pixel is referred to as a neighboring, or neighborhood, pixel to the central pixel. FIG. 6 shows an example three-by-three pixel neighborhood 600, according to an embodiment of the invention. A central pixel 602 is located at the center of the neighborhood 600. The other pixels of the neighborhood 600, including pixels 604A, 604B, . . . , 604N, collectively referred to as the pixels 604, are neighboring or neighborhood pixels to the central pixel 602.

The classical bilateral filter can be mathematically described as:

$$u_0 = \frac{\sum_n L_n \cdot g(\beta|f_n - f_0|) \cdot f_n}{\sum_n L_n \cdot g(\beta|f_n - f_0|)}. \tag{1}$$

In equation (1), the index 0 refers to the central pixel that is to be filtered to have a new value thereof determined, and the index n refers to the n-th neighbor of this pixel. Furthermore, $g(\bullet) \in [0,1]$ is a photometric function, $\beta$ is a scaling parameter related to edge strength, f is the value of a pixel, and $L_n$ is the spatial weight of the neighboring pixel n relative to the central pixel. The sum over n includes n=0. The value $u_0$ is the new value for the central pixel. The photometric function determines the relative importance of neighboring pixels due to their photometric difference from the central pixel, as known within the art. The value of the photometric function is between 0 and 1, where the larger the absolute photometric distance is, the smaller the value of the photometric function is. The scaling parameter $\beta$ determines the sensitivity of the function to photometric differences. It may vary from pixel to pixel.

In one embodiment, the formulation of the classical bilateral filter is generalized to use different combinations of multiple neighboring pixels for each neighboring pixel. In equation (1), for instance, the value of a neighboring pixel, $f_n$, is replaced by a predictor function, $P_n$. A predictor function can be a linear combination of one or more neighboring pixels. The constant predictor function $P_n$ equals $f_n$ provides the zero-order formulation of equation (1), and is best suited to reproduce image or signal profiles corresponding to a zero-order polynomial (piecewise constant). Higher-order predictors are obtained by using more neighboring pixels, and are better suited to reproduce image or signal profiles corresponding to higher order polynomials, such as piecewise linear polynomials, and so on. This property enables avoidance of undesirable smoothing across gradual edges characteristic of high-resolution images. Thus, the classical bilateral filter is reformulated as:

$$u_0 = \frac{\sum_n L_n \cdot g(\beta|P_n - f_0|) \cdot P_n}{\sum_n L_n \cdot g(\beta|P_n - f_0|)}. \quad (2)$$

The bilateral filter may be written equivalently as:

$$u_0 = f_0 + \frac{\sum_{n \neq 0} L_n \cdot g(\beta|\delta_n|) \cdot \delta_n}{L_0 + \sum_{n \neq 0} L_n \cdot g(\beta|\delta_n|)}. \quad (3)$$

In equation (3), $\delta_n = P_n - f_0$ is the change to the central pixel value $f_0$ proposed by predictor $P_n$. This value $\delta_n$ is referred to as the prediction difference for predictor $P_n$. The classical zero-order prediction difference is $\delta_n = f_n - f_0$. The credibility-weighted bilateral filter employed by embodiments of the invention, like the classical bilateral filter, determines a weighted average of pixels in the defined neighborhood. In both the credibility-weighted and the classical bilateral filters, the contribution from each pixel of the neighborhood to the new value of the central pixel depends on the spatial distance of the pixel from the central pixel, and the prediction difference relative to the central pixel. With respect to the former, a Gaussian function may be used to reduce the spatial weight of pixels that are farther away from the central pixel. With respect to the latter, the contribution of each prediction difference is weighted by the photometric function, such that if that difference is low, the weight is high, and vice-versa.

Unlike the classical bilateral filter, however, the credibility-weighted bilateral filter further determines the contribution from each neighborhood predictor to the new value of the central pixel depending on the credibility values of the pixels in the neighborhood. For a predictor, $P_n$, a credibility value $C_n$ is defined. The contribution from each predictor depends on the credibility value of the predictor, as well as the credibility of the central pixel itself. Two mechanisms use the pixel credibility values. First, the sensitivity of the photometric function, g in equation (3), is made to depend on the credibility of the central pixel. That is, the credibility value of the central pixel influences the sensitivity of the photometric function employed to all prediction differences. Second, the weight of each predictor difference is made proportional to the credibility value corresponding to the predictor.

The primary effect of the first mechanism is that if the credibility of the central pixel is low, the weight of each of its neighboring pixels increases. For example, in the classical bilateral filter a neighboring pixel with a large photometric difference from the central pixel will receive a much lower weight than the central pixel. However, by comparison in an embodiment of the invention, if the central pixel has low credibility the same neighboring pixel may receive a significantly higher weight both absolutely, and relative to the central pixel.

The credibility value of a predictor is a function of the credibility values of its constituent neighboring pixels. A zero-order predictor, for example, is made up of a single neighborhood pixel and its credibility is equal to the credibility value of that neighborhood pixel. A first-order predictor, $P_n$, is a linear combination of two neighborhood pixels, $n_1$ and $n_2$. For instance, the pixels might comprise opposing pairs relative to the central pixel, and the predictor function might be the average of the two pixel values. Its credibility value is a function of the two pixel credibility values. A function for combining two pixel-credibility values desirably has a range of [0, 1] and desirably is not larger than any of the individual credibility values. Suitable functions include, for instance, so-called "fuzzy AND" functions known within the art. More specifically, for example, such functions can include:

$$C_{n1,n2} = \min(C_{n1}, C_{n2}); \quad (4)$$

$$C_{n1,n2} = C_{n1} \cdot C_{n2}; \text{ and,} \quad (5)$$

$$C_{n1,n2} = \lfloor C_{n1} + C_{n2} - 1 \rfloor_0. \quad 6)$$

In equation (6), the notation $\lfloor \cdot \rfloor_0$ indicates clipping of negative values to zero. The functions of equations (4)-(6) are ordered by how severely they penalize the pair-credibility based on individual pixel credibility values.

A credibility-weighted bilateral filter can be mathematically expressed as follows:

$$u_0 = \frac{\sum_n L_n C_n \cdot g(\beta C_0 |P_n - f_0|) \cdot P_n}{\sum_n L_n C_n \cdot g(\beta C_0 |P_n - f_0|)}. \quad (7)$$

The difference between the bilateral filter of equation (1) and the credibility-weighted bilateral filter of equation (7) is the presence of the credibility values $C_0$, which is the credibility value of the central pixel, and $C_n$, which is the credibility value of the predictor $P_n$. The credibility-weighted zero-order bilateral filter can be equivalently written as:

$$u_0 = f_0 + \frac{\sum_{n \neq 0} L_n C_n \cdot g(\beta C_0 |\delta_n|) \cdot \delta_n}{L_0 C_0 + \sum_{n \neq 0} L_n C_n \cdot g(\beta C_0 |\delta_n|)}. \quad (8)$$

For instance, the behavior of the zero-order credibility-weighted bilateral filter ranges from two extreme cases. First, if the central pixel has zero credibility, such that $C_0 = 0$, then its value is replaced by a weighted average of the values of its neighboring pixels, regardless of their contrast similarity to the central pixel, but whether their relative weights are equal to their credibility values. As such, the central pixel's value is replaced by an average of its neighboring pixels to the extent that the neighboring pixels are valid. In this case, the described process performs the functionality of in-filling (i.e., filling in missing data), rather than denoising.

Second, if the central pixel has full credibility, such that $C_0 = 1$, then its value is replaced by a modified bilateral weighted average of its value and the values of its neighboring pixels. The bilateral weight of each neighboring pixel depends both on its contrast similarity to the central pixel, and on its credibility. As such, the central pixel's value is adjusted according to a bilateral weighted average of it and its neighboring pixels, where the neighboring pixels contribute to this average to the extent that they are valid. Unlike the classical bilateral filter, low-credibility pixels are at least substantially excluded from consideration and hence do not distort the result.

It has been observed that a zero-order bilateral filter can be less than ideal for higher-resolution images, which are images having a large number of pixels. In such images, edges between objects within the images can span a number of pixels, and appear as gradual changes. A first order filter may be used that employs pairs of pixels for prediction. A predictor difference may be, for instance, $$\delta_{n1,n2} = \frac{(f_{n1} + f_{n2})}{2} - f_0.$$

The first-order bilateral filter, as has been described, is better suited to higher-resolution images than the zero-order bilateral filter. However, it has been found that the first-order bilateral filter does not remove some types of distortions from images as well as the zero-order bilateral filter does. This is because often there is no pair of opposing pixels with high credibility in the neighborhood of the defect. Therefore, a desirable trade-off for at least substantially removing or reducing both distortions and noise can be obtained by weighting the response of both filters. When both pixels in a pair have high credibility, it is desirable to employ the first-order filter for better signal preservation. If, however, just one of the pixels in the pair has high credibility, it is desirable to employ the zero-order term so as not to lose the content of that pixel. The weighting function itself, therefore, is based on the similarity between the credibility values of the pair of pixels in question.

A credibility-weighted combined zero-order and first-order bilateral filter can be expressed mathematically as:

$$u_0 = f_0 + \alpha \cdot [\text{Credibility weighted first order bilateral filter}] + \quad (9)$$
$$(1 - \alpha) \cdot [\text{Credibility weighted zero order bilateral filter}].$$

In equation (9), the bracketed credibility-weighted first-order bilateral filter is the second term to the right of the equals sign in equation (9) (i.e., the right-hand-most term). The bracketed credibility-weighted zero-order bilateral filter is the third term to the right of the equals sign in equation (9) (i.e., the right-hand-most term). The weight given to the credibility weighted first-order bilateral filter may be in one embodiment $$\alpha = \frac{\min(C_{n_1}, C_{n_2})}{\max(C_{n_1}, C_{n_2})}.$$

This weighting factor $\alpha$ ensures that the first-order filter is used when the pair of pixels in question have similar credibility, but that the zero-order filter is used when the differences between the pixels credibility values is significant. The combined filters approach described above may be employed in general with credibility-weighted bilateral filters of even higher order.

Referring back to FIG. 5, the performance of parts 504 and 506 for each pixel of the digital visible light representation 110 of the image 104 results in the digital filtered visible light representation 122 of the image 104, as indicated by the arrow 120. The filtered visible light representation 122 differs from the digital visible light representation 110 in that the latter results upon application of a credibility-weighted bilateral filter to the former, as has been described in detail. The filtered visible light representation 122 of the image 104 is thus that from which effects of dust, scratches, noise, artifacts, defects, and/or other distortions have been substantially reduced or removed via the application of a credibility-weighted bilateral filter.

The digital filtered visible light representation 122 of the image 104 is finally output (508). Such outputting can encompass any of a number of different acts or steps, and is not limited by embodiments of the invention. For example, the filtered visible light representation 122 may be stored on a computer-readable storage medium, such as a volatile or a non-volatile storage of a scanning device or a computing device. As another example, the filtered visible light representation 122 may be transmitted or sent from one device to another device. As a third example, the filtered visible light representation 122 may be printed by a printing device on a printing medium, such as paper or another type of printing media.

Figure 7:
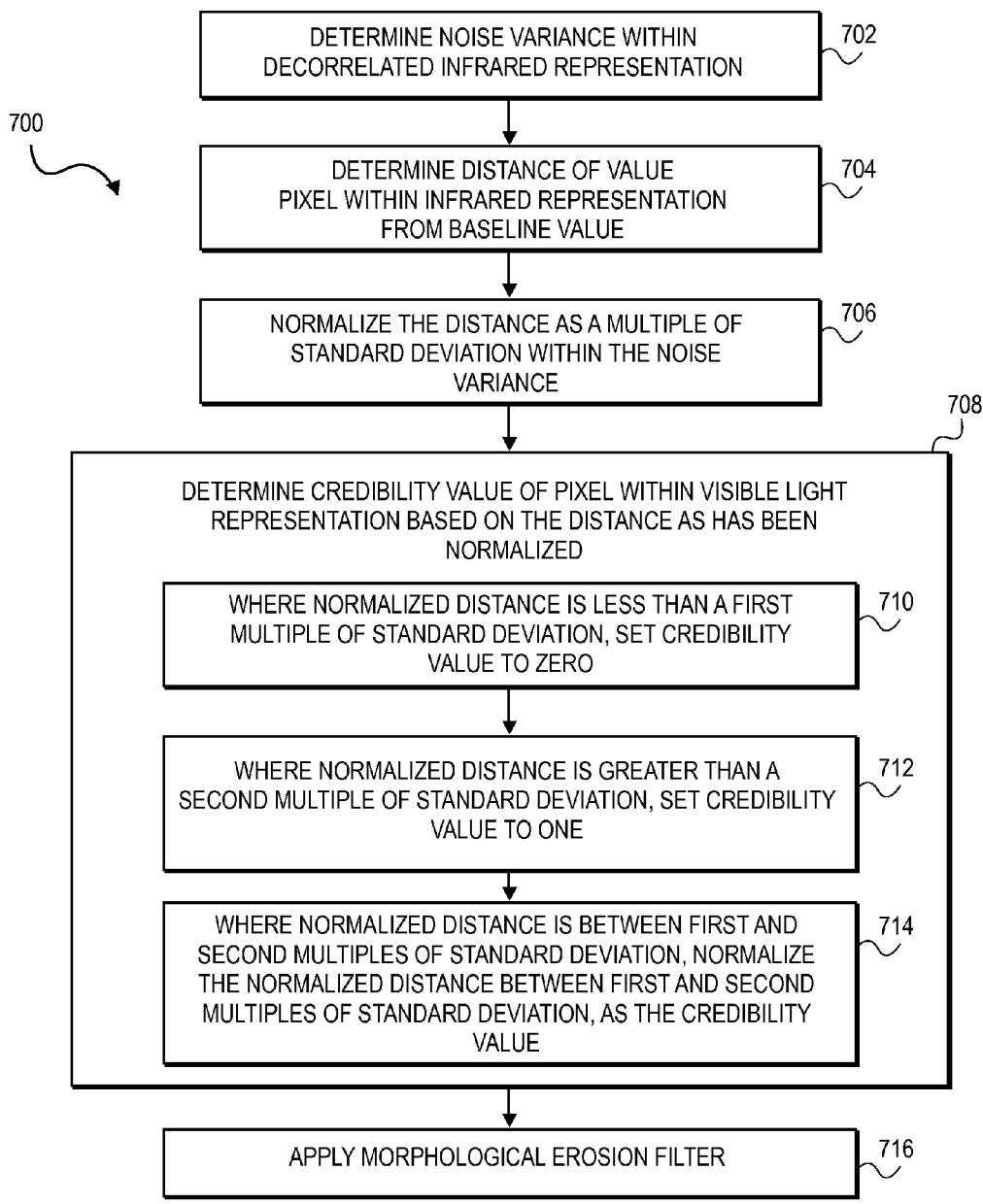
FIG. 7 is a flowchart of a method for determining a credibility value of a pixel of an image, and which can be employed in relation to the method of FIG. 5, according to an embodiment of the invention.

Determining Credibility Weights used in Credibility-Weighted Bilateral Filtering FIG. 7 shows a method 700 for determining a credibility value of a pixel of the image 104, according to an embodiment of the invention. The method 700 may be employed in part 504 of the method 500 of FIG. 5 that has been described. The method 700 may be implemented as a computer program stored on a computer-readable medium. For example, the computer-readable medium may be part of a scanning device, such that the computer program stored thereon is executed within the scanning device. A credibility value, as has been described, can in one embodiment correspond to the likelihood that the pixel's value is valid in relation to the image 104 itself, or that the pixel's value does not correspond to a distortion within the digital visible light representation 110 of the image 104.

To determine the credibility values of the pixels within the visible light representation 110 of the image 104, a distortion model is employed. In one embodiment, the distortion model employed that is used to determine the credibility values from the decorrelated infrared representation 116 of the image 104 assumes that a given pixel is a distortion if it is dark and has a low probability of originating from the noise model of the decorrelated infrared representation 116. This noise model can be a random Gaussian noise model, for instance. The following description describes how the parameters of this noise model are determined from statistics of the decorrelated infrared representation 116, as well as a method for using these parameters to determine pixel credibility values.

First a noise variance within the digital decorrelated infrared representation 116 of the image 104 is determined (702). The decorrelated infrared representation 116 can be assumed to follow a standard Gaussian distribution in one embodiment. The noise variance may be mathematically expressed as $\sigma^2$, and can be determined from the decorrelated infrared representation 116 using any type of technique or algorithm used for determining noise variance within a data set or, more generally, a signal. In one embodiment, the noise variance may be mathematically determined as simply the sample variance within the decorrelated infrared representation 116 itself, or:

$$\sigma^2 = \Sigma_n (i_n - \mu)^2. \quad (10)$$

In equation (10), $i_n$ is the value of pixel n within the decorrelated infrared representation 116 of the image 104, and $\mu$ is the mean over all N pixels of the decorrelated infrared representation 116. In this situation, after decorrelation, $\mu$ is set equal to B, the infrared background, as has been described.

Next, for the pixel of the image 104 in relation to which the method 700 is being performed, the distance of the value of the pixel within the decorrelated infrared representation 116 of the image 104 from a baseline value is determined (704). The baseline value can in one embodiment be the background value y that has been described in relation to part 314 of the method 300 of FIG. 3. The distance of this infrared value of the pixel in question can thus be expressed as:

$$d = i_n - B. \tag{11}$$

In equation (11), d is the distance of the pixel in question, $i_n$ is its infrared value within the decorrelated infrared representation 116, and B is the baseline value of the infrared background.

The distance is further normalized as a multiple of the standard deviation within the noise variance. That is, $$d' = \frac{d}{s}, \tag{12}$$

where d' is the normalized distance, and s is the standard deviation within the noise variance. The standard deviation within the noise variance can be determined conventionally, via:

$$s = \sqrt{\frac{1}{N-1} \sum_{k=1}^{N} (i_k - \mu)^2}. \tag{13}$$

In equation (13), N is the total number of pixels within the image 104, $i_k$ is the infrared value of pixel k within the decorrelated infrared representation 116, and μ is the infrared background, B.

The credibility value for the pixel in relation to which the method 700 of FIG. 7 is being performed is determined based on this determined distance as has been normalized (708). In one particular embodiment, the credibility value is determined as the probability of this normalized distance within a standard normal variable, as can be appreciated by those of ordinary skill within the art. That is, the credibility value is determined from the probability of the normalized distance in relation to a standard normal distribution, which is the Gaussian distribution.

Figure 8:
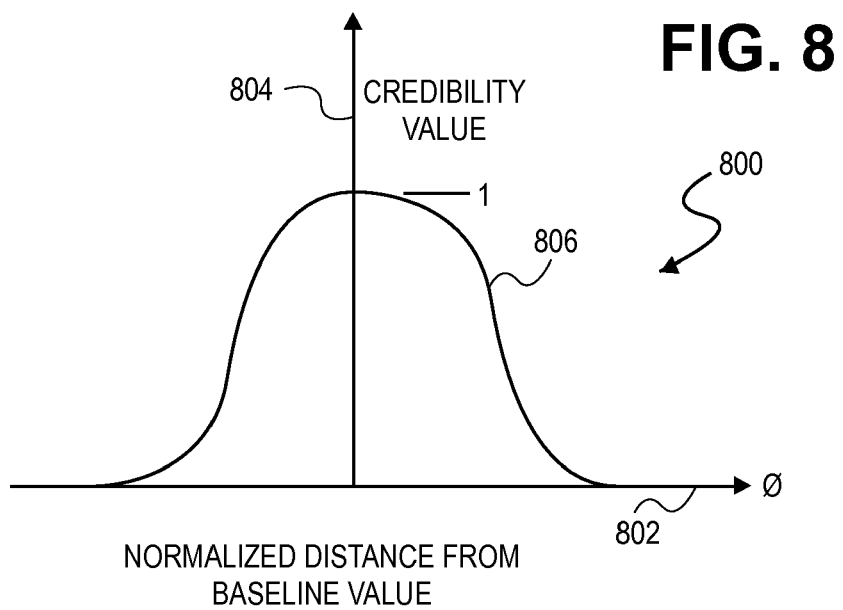
FIG. 8 is a diagram of a standard Gaussian distribution in relation to which the credibility value of a pixel of an image can be determined in the method of FIG. 7, according to an embodiment of the invention.

FIG. 8 shows a graphic 800 illustratively depicting a standard Gaussian distribution in relation to which the credibility value for a pixel can be determined in part 708 of the method 700 of FIG. 7, according to an embodiment of the invention. The x-axis 802 denotes the normalized distance of the infrared value of a pixel from the baseline value, whereas the y-axis 804 denotes probability, which in this instance is the credibility value of the pixel. The curve 806 is the standard Gaussian distribution curve. The baseline value on the x-axis 802 corresponds to a credibility value of 1 within the curve 806. As the normalized distance decreases from the baseline value on the x-axis 802, the credibility value ultimately decreases to zero along the curve 806. Therefore, the credibility value for a pixel is determined using the curve 806 by locating the probability, or credibility value, on the curve 806 that corresponds to the normalized distance for the pixel in question.

Referring back to FIG. 7, in another embodiment, in lieu of using a standard normal distribution to determine the credibility value for the pixel, parts 710, 712, and 714 are performed, which are referred to as parameterized threshold functions. If the normalized distance determined in part 706 is less than a first threshold multiple of the standard deviation within the noise variance, then the credibility value is set to zero (710). By comparison, if the normalized distance is greater than a second threshold multiple of the standard deviation, then the credibility value is set to one (712). Otherwise, if the normalized distance is between the first and the second threshold multiples of the standard deviation, then the credibility value is set as the normalized value of the normalized distance between these first and second threshold multiples (714).

For example, the first threshold multiple may be negative three, and the second threshold multiple may be negative one. In this instance, a pixel having a normalized distance that is at least three standard deviations below the baseline value is automatically considered as being defective, such that its credibility value is set to zero in part 710. By comparison, a pixel having a normalized distance that is greater than one standard deviation below the baseline value is automatically considered as being valid, such that its credibility value is set to one in part 712. In the third case, if a pixel has a normalized distance between three standard deviations below the baseline value and one standard deviation below the baseline value, then the normalized distance is normalized again between these two extremes. As such, the resulting credibility value is within the range [0, 1].

Finally, in one embodiment of the invention, the credibility value may be subjected to a morphological erosion filter (716). Morphological erosion is a filtering technique known by those of ordinary skill within the art. Morphological erosion filtering is particularly beneficial where the digital infrared representation 112 of the image 104 is misregistered, or unaligned, in relation to the digital visible light representation 110 of the image 104.

For example, the scanning processes of the image 104 fixed on the imaging medium 102 indicated by the arrows 106 and 108 may occur at different times. First a movable scanning mechanism may move across the imaging medium 102 to capture the visible light representation 110 of the image 104. The scanning mechanism may then return to its initial position, and move across the imaging medium 102 again to capture the infrared representation 112 of the image 104. The scanning mechanism and/or the imaging medium 102 itself may become misaligned between these two scanning operations. As such, the pixel (x, y) of the visible light representation 110 may not corresponding to the pixel (x, y) of the infrared representation 112, but rather correspond to the pixel (x+a, y+b) of the infrared representation 112. Such misalignment is desirably corrected a priori using any suitable image registration technique, as can be appreciated by those of ordinary skill within the art. However, these registration techniques can often result in images that are not perfectly aligned, but where the alignment error is within a single pixel. Thus, applying a morphological erosion filter is a technique that can be used to correct defects despite such residual misregistration of pixels between the representations 110 and 112.

As has been noted, the credibility value determination of the method 700 of FIG. 7 can be employed in relation to the credibility-weighted bilateral filtering of the method 500 of FIG. 5. Both the methods 500 and 700 have been particularly described in relation to an image 104 that is fixed on a imaging medium 102 and that is then scanned, as indicated by the arrows 106 and 108, to result in a digital visible light representation 110 thereof and a digital infrared representation 112 thereof. However, the methods 500 and 700 are not limited by embodiments of the invention to performance in relation to such scanned representations of an image.

For example, in another embodiment, the methods 500 and 700 may be performed in relation to a digital visible light representation 110 and a digital infrared representation 112 of an image that are acquired or generated in a manner other than scanning. Even more generally, the methods 500 and 700 may be performed in relation to data sets, and more generally signals, that are not representations of an image per se. For example, both methods may instead be performed in relation to any type of data set or signal, where the terminology "signal" is inclusive of the terminology "data set." Such data sets and signals include those, for instance, that correspond to or represent measured physical qualities, and which include data points, instead of image pixels. The credibility value for such a data point is the likelihood that the data point is valid as opposed to invalid, by any desired manner.

Representative Scanning Device

Figure 9:
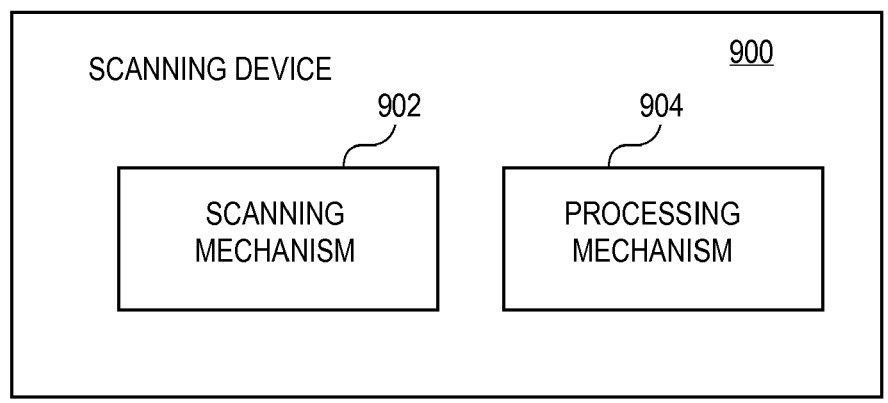
FIG. 9 is a block diagram of a rudimentary scanning device, according to an embodiment of the invention.

FIG. 9 shows a rudimentary and representative scanning device 900, according to an embodiment of the invention. The scanning device 900 may be a standalone scanner, or an "all-in-one" (AIO) device that includes printing and/or other functionality in addition to scanning functionality. The scanning device 900 is depicted in FIG. 9 as including a scanning mechanism 902 and a processing mechanism 904. As can be appreciated by those of ordinary skill within the art, the scanning device 900 can and typically will include additional components or mechanism, besides those depicted in FIG. 9.

The scanning mechanism 902 includes the hardware by which the scanning device 900 is able to capture the image 104 fixed on the imaging medium 102 as both the digital visible light representation 110 and the digital infrared representation 112, as indicated by arrows 106 and 108. The scanning mechanism 902 may include two sets of sensors, one for generating the visible light representation 110, and another for generating the infrared representation 112. Alternatively, the scanning mechanism 902 may generate both the representations 110 and 112 using the same set of sensors.

The scanning mechanism 902 may be movable or stationary. Where the scanning mechanism 902 is movable, typically the imaging medium 102 remains stationary, and the scanning mechanism 902 is moved over the medium 102 to capture the image 104 as the digital visible light representation 110 and the digital infrared representation 112. Where the scanning mechanism 902 is stationary, typically the imaging medium 102 is moved by the scanning device 900 over the scanning mechanism 902 so that the mechanism 902 captures the image 104 as the representations 110 and 112. Alternatively, a user may have to manually move the scanning device 900 over the imaging medium 102 for the scanning mechanism 902 to capture the representations 110 and 112 of the image 104 fixed on the medium 102.

The processing mechanism 904 may be implemented in software, hardware, or a combination of software and hardware. The processing mechanism 904 is to substantially reduce or remove the effects of dust, scratches, noise, artifacts, defects, and/or other distortions within the digital visible light representation 110 of the image 104. The processing mechanism 904 employs a credibility-weighted bilateral filter, as has been described. Furthermore, the processing mechanism 904 decorrelates the digital visible light representation 110 from the digital infrared representation 112 of the image 104 to generate the credibility values used within the credibility-weighted bilateral filter. Therefore, it is said that the credibility-weighted bilateral filter uses both the representations 110 and 112 of the image 104, insofar as the infrared representation 112 is used to generate the credibility values employed during credibility-weighted bilateral filtering. The processing mechanism 904 can thus be that within the scanning device 900 which performs the methods that have been described.

We claim:

1. A method for substantially reducing effects of noise and distortions within a digital image in a single pass of the image, comprising:

for each of a plurality of pixels of the digital image, determining a new value for the pixel by using a bilateral filter taking into account values of the pixels within the digital image, and credibility values of the pixel, the credibility value for a pixel corresponding to a likelihood that a value of the pixel is valid in relation to the image and that the value does not correspond to distortions within the digital image; and, outputting the digital image within which the effects of distortions have been reduced, wherein the credibility value for each pixel corresponds to a likelihood that the value of the pixel is valid in relation to the image, regardless of whether the pixel is part of an edge of the image or not part of the edge of the image.

2. The method of claim 1, further comprising for each of the plurality of pixels of the digital image, determining the credibility value for the pixel based on a measured representation of the pixel, the measured representation being one or more of:

a visible light representation of the digital image, and an infrared representation of the digital image.

3. The method of claim 2, wherein determining the credibility value for the pixel comprises employing a predetermined distortion model, the predetermined distortion model including a distribution that is independent of the digital image.

4. The method of claim 2, wherein determining the credibility value for the pixel comprises:

determining a noise variance within an infrared representation of the digital image;

determining a distance of a value of a corresponding pixel within the infrared representation from a baseline value;

normalizing the distance as a multiple of a standard deviation from the noise variance; and, determining the credibility value of the pixel within the digital image based on the distance of the value of the corresponding pixel within the infrared representation from the baseline value as has been normalized.

5. The method of claim 4, wherein the credibility value for the pixel is adjusted based on one or more parameters comprising converting the distance as normalized to credibility values within the range [0, 1] using one or more parameterized threshold functions.

6. The method of claim 4, wherein determining the credibility value for the pixel further comprises applying a morphological erosion filter to the credibility values of the pixels of the image.

7. The method of claim 1, wherein using the bilateral filter, taking into account the credibility values for the pixels within the digital image comprises one or more of:

decreasing a sensitivity of a photometric function employed within the bilateral filter according to the credibility value for the pixels; and, proportionally weighting each predictor function determined from multiple neighboring pixels by a function of the credibility values for the neighboring pixels.

8. The method of claim 1, wherein using the bilateral filter, taking into account the credibility values for the pixels within the digital image comprises:

decreasing a sensitivity of a photometric function employed within the bilateral filter by weighting a difference of a value of the pixel and a value of each neighboring pixel by the credibility value of the pixel within the bilateral filter; and, proportionally weighting each value of a neighboring pixel by the credibility value of the neighboring pixel within the bilateral filter.

9. The method of claim 1, wherein using the bilateral filter, taking into account the credibility values for the pixels within the digital image comprises:

decreasing a sensitivity of a photometric function employed within the bilateral filter by weighting a difference of a value of the pixel and a function of pairs of neighboring pixels by the credibility value of the pixel within the bilateral filter; and, proportionally weighting each function of pairs of neighboring pixels by a function of the credibility values of the pair of neighboring pixel within the bilateral filter.

10. The method of claim 1, wherein the bilateral filter is a combined m-order and n-order bilateral filter, where n is different than m.

11. A method for substantially reducing effects of noise and distortions within a digital image in a single pass of the image, comprising:

for each of a plurality of pixels of the digital image, determining a new value for the pixel by using a bilateral filter taking into account values of the pixels within the digital image, and credibility values of the pixel, the credibility value for a pixel corresponding to a likelihood that a value of the pixel is valid in relation to the image and that the value does not correspond to distortions within the digital image; and, outputting the digital image within which the effects of distortions have been reduced, wherein the bilateral filter is a combined m-order and n-order bilateral filter, where n is different than m, and wherein the bilateral filter is a combined zero-order bilateral filter and first-order bilateral filter, having an output that is a weighted average of the zero-order bilateral filter and the first-order bilateral filter, a weight of the first-order bilateral filter determined by a ratio between a minimum of two pixel credibility values employed in each of a plurality of first-order predictors, and a maximum of the two pixel credibility values.

12. A method comprising:

for each of a plurality of points of a signal, the signal corresponding to a measured physical quality, determining a credibility value corresponding to a likelihood that a value of the point is valid in relation to the signal and that the value does not correspond to distortions within the signal;

determining a new value for the point by using a bilateral filter taking into account the credibility values determined for the points, including:

weighting a difference of a value of the point and a value of each neighboring point by the credibility value of the point;

weighting a spatial weight of each neighboring point by the credibility value of the neighboring point; and, outputting the signal having the new values for the points thereof, wherein the credibility value for each point corresponds to a likelihood that the value of the point is valid in relation to the signal, regardless of whether the point is part of an edge of the signal or not part of the edge of the signal.

* * * * *